(12) United States Patent
Menardo et al.

(10) Patent No.: US 8,550,823 B2
(45) Date of Patent: Oct. 8, 2013

(54) RIGID TO ELASTIC ELECTRODE CONNECTION

(75) Inventors: Philippe Menardo, Beaulieu (FR); Arnaud Fourmon, Nice (FR); Philippe F. Jean, Nice (FR); Ambroise A. Wattez, Nice (FR)

(73) Assignee: Single Buoy Moorings, Inc., Marly (CH)

( * ) Notice: Subject to any disclaimer, the term of this patent is extended or adjusted under 35 U.S.C. 154(b) by 99 days.

(21) Appl. No.: 13/298,010

(22) Filed: Nov. 16, 2011

(65) Prior Publication Data

US 2012/0322274 A1  Dec. 20, 2012

Related U.S. Application Data

(60) Provisional application No. 61/435,639, filed on Jan. 24, 2011, provisional application No. 61/447,953, filed on Mar. 1, 2011, provisional application No. 61/511,842, filed on Jul. 26, 2011.

(51) Int. Cl.
  *H01R 39/00* (2006.01)
(52) U.S. Cl.
  USPC ............................................................ 439/4

(58) Field of Classification Search
  USPC .................. 439/5; 310/309, 363, 800, 328, 310/344
  See application file for complete search history.

(56) References Cited

U.S. PATENT DOCUMENTS

| | | | |
|---|---|---|---|
| 6,583,533 B2 * | 6/2003 | Pelrine et al. ................. | 310/309 |
| 6,759,769 B2 * | 7/2004 | Kirjavainen .................. | 307/400 |
| 7,834,527 B2 * | 11/2010 | Alvarez Icaza Rivera et al. ............................. | 310/344 |
| 7,857,183 B2 * | 12/2010 | Shelton, IV ................ | 227/175.1 |
| 8,042,264 B2 * | 10/2011 | Rosenthal et al. ............. | 29/825 |
| 8,092,391 B2 * | 1/2012 | Couvillon, Jr. ............... | 600/459 |
| 8,093,783 B2 * | 1/2012 | Rosenthal et al. ............ | 310/328 |
| 8,120,195 B2 * | 2/2012 | Pollack et al. .................. | 290/53 |
| 8,181,338 B2 * | 5/2012 | Benslimane et al. .......... | 29/846 |
| 8,283,839 B2 * | 10/2012 | Heim ........................... | 310/328 |
| 8,316,526 B2 * | 11/2012 | Pei et al. ........................ | 29/594 |
| 8,317,074 B2 * | 11/2012 | Ortiz et al. ................. | 227/176.1 |
| 8,350,447 B2 * | 1/2013 | Jungnickel et al. ...... | 310/323.02 |

* cited by examiner

*Primary Examiner* — Jean F Duverne
(74) *Attorney, Agent, or Firm* — Leon D. Rosen

(57) ABSTRACT

An electrical connection assembly (70, FIGS. 4-7) connects a cable conductor (82) of stiff material such as a copper wire, to a deformable electrode (34, FIG. 5) that lies at the surface of a sheet of elastomeric material (74). The connector assembly includes deflectable elastomeric walls that form a cavity (76) that holds an electrically conductive fluid (84) such as an electrolyte that surrounds and engages the stiff conductor (82) and that engages the elastic electrode (34) as it deflects.

10 Claims, 6 Drawing Sheets of a
RIGID TO ELASTIC ELECTRODE CONNECTION

CROSS-REFERENCE

Applicant claims priority from U.S. provisional patent application Ser. No. 61/435,639 filed Jan. 24, 2011; Ser. No. 61/447,953 filed Mar. 1, 2011; and Ser. No. 61/511,842 filed Jul. 26, 2011.

BACKGROUND OF THE INVENTION

One type of device obtains electrical energy from repeated back and forth movements of a phenomenon, such as repeated movements of waves in a sea. The movements cause repeated stretching and relaxation of an elastomeric sheet, and corresponding movements closer and further apart of electrodes that lie at opposite faces of the sheet. The electrodes contain electrical charges, so as the electrodes move closer together and further apart the voltage between the electrodes varies and the device can be used to generate electrical power.

A copper wire or the like carries electricity to charge the electrodes and carries away electricity generated by the device. However, if one part such as the electrode on the elastomeric sheet, repeatedly stretches and relaxes, while the other part such as a stainless steel conductor does not move with the electrode, then it is difficult to keep the electrode and stainless steel conductor in constant low resistance electrical engagement. Also, repetitive change of shape of a stainless steel conductor can result in fatigue failure. An electrical connection assembly that provided a reliable electrical connection between a part that is repeatedly stretchable such as an electrode on an elastomeric sheet, and a non-deformable conductor such as a stainless steel conductor, would be of value.

SUMMARY OF THE INVENTION

In accordance with one embodiment of the invention, an electrical connection assembly is provided that electrically connects a first part that repeatedly stretches and relaxes, or moves back and forth, to a rigid second part that does not stretch and relax or move with the first part. In one example, the first part is coupled to a sheet of elastomeric material that is repeatedly stretched and relaxed, while the second part is a non-deformable stiff cable conductor such as one made of copper or stainless steel.

Applicant forms a cavity that includes cavity walls formed by the electrode that lies against a face of the elastomeric sheet, places the stainless steel cable in the cavity, and places an electrically conductive fluid such as an electrolyte in the cavity. As the sheet of elastomeric material deflects so the cavity walls deflect, the conductive fluid moves in the cavity but remains in contact with both the walls of the cavity and the stainless steel cable.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
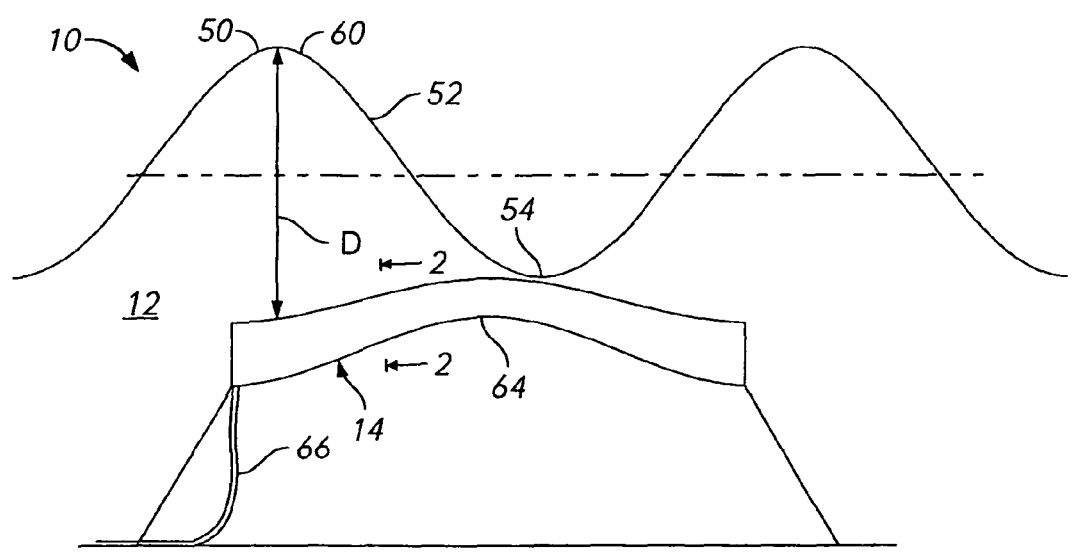
FIG. 1 is a side elevation view of a system that converts wave energy to electricity.
Figure 2:
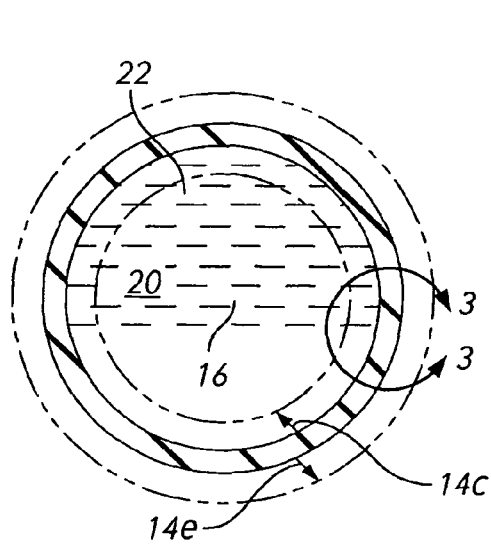
FIG. 2 is a sectional view taken on line 2-2 of FIG. 1.
Figure 3:
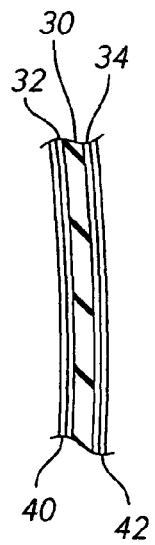
FIG. 3 is a view of area 3-3 of FIG. 2.

FIG. 1 shows a system 10 that generates electricity from the action of waves in a sea 12. The system includes a tube 14 of elastomeric (elastic), or stretchable, material such as electroactive polymer. As shown in FIG. 2, the tube is primarily cylindrical, with an axis 16, and it expands, or stretches, as to 14E and contracts to 14C. A quantity 20 of water fills completely the particular tube illustrated, and some foam can be used outside for buoyancy. FIG. 3 shows that the walls of the tube include a sheet 30 (in the form of a tube with ends merging) of elastomeric material, first and second, or inner and outer electrodes 32, 34 that lie against opposite faces of the sheet, and protective layers 40, 42 that lie over the electrodes. There is an electric charge on each electrode. Preferably, there are multiple layers, each made of a sheet 30, electrodes 32, 34 and protective layers 40, 42. Such multiple layer arrangement can be formed out of one very long rolled up sheet 30, to form a compact cylinder of elastic material with electrodes at its faces.

In FIG. 1, the crest 50 of a wave 52 lies a large distance D above the tube end, while at 54 the wave lies only a small distance above the tube middle. In fact, oscillating pressure of seawater outside the tube wall due to ocean waves creates a localized pressure gradient across the tube wall relative to the sea water inside the tube. The walls of the tube have a high elasticity so that they can distend in response to the pressure gradient, so inducing a bulge wave within the tube.

Figure 4:
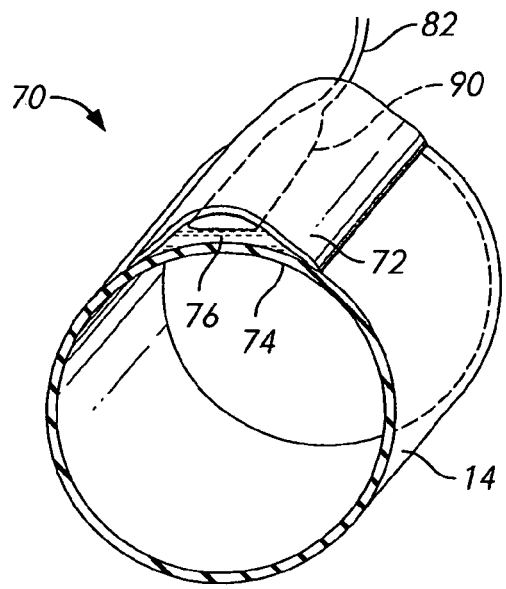
FIG. 4 is a partial isometric and sectional view of a tube of the system of FIG. 1, showing a connection assembly which connects a stretchable electrode to a non moving stiff conductor.
Figure 5:
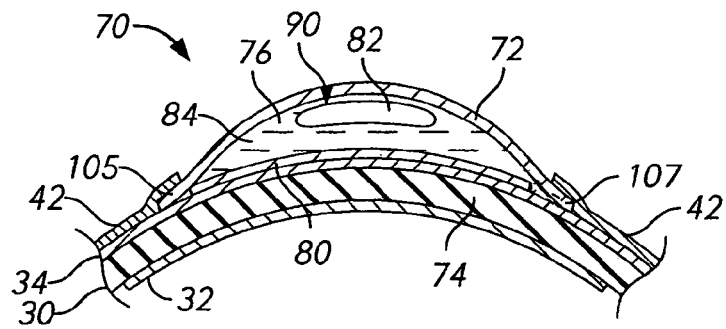
FIG. 5 is a sectional view of a portion of the system of FIG. 4.
Figure 6:
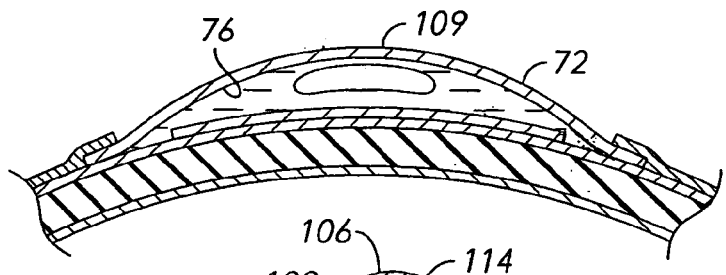
FIG. 6 is a view similar to that of FIG. 5, but wherein the tube has expanded.

FIGS. 4-6 show a portion of the tube 14 of FIG. 1, that has an electrical connection assembly 70. The connection assembly includes upper and lower walls 72, 74 (FIG. 5) forming a cavity 76 between them. The upper wall preferably forms an upwardly deflected loop. The lower wall 74 includes an electrically conductive membrane 80 (FIG. 5) that serves as part of electrode 34 and that lies on the outer side of the elastomeric sheet 30 that extends in a tube. Another electrode 32 lies on the inner side of the sheet 30. A stainless steel conductor 82 projects into the cavity. The cavity holds a quantity of electrically conductive fluid 84 that can comprise a gel or preferably a liquid metal, that remains in electrical connection with the electrodes 34, 80, that lie on the outer side of the elastomeric sheet and that remains in contact with the stainless steel conductor 82, despite limited relative movements of the part. The conductive seal 80 protects the electrode 34 while allowing the transfer of electrical charges. The conductive seal prevents any chemical reaction involving the electrodes and prevents shorts. The electrically conductive fluid is in the form of a liquid such as a liquid metal.

When the tube 14 expands or contracts in diameter, the connection assembly 70 changes configuration such as between the configuration of FIG. 5 and that of FIG. 6. The particular upper wall 72 is formed of flexible solid (non-flowable) material that can bend, and is not necessarily formed of elastomeric material (elastomeric material has a Young's modulus of elasticity of no more than 50,000 psi). (Applicant defines a "stiff" material as one with a Young's modulus of at least 500,000 psi.). The walls of the tube formed by the elastomeric sheet 30 must be formed of elastomeric material in order to stretch and relax. In FIG. 6, the width of the cavity 76 has increased about 20% from the width in FIG. 5.

In order to increase the area of contact of the conductive fluid or gel 84 with the stainless steel conductor 82, applicant prefers to flatten a portion 90 (FIG. 4) of the stainless steel conductor 82 that lies in the cavity. For a stainless steel conductor that was originally cylindrical, applicant flattens it to have a width more than twice its original width. The conductor 82 extends along the length of the cavity. Instead of using stainless steel for the conductor, other hard, or stiff conductors can be used, that is, electrical conductors can be used that are highly conductive even though they readily experience fatigue failure from repeated bending. A variety of conductive fluids or gels 84 can be used to fill the cavity 76, including an electrolyte, a metal alloy that is fluid at room temperature, a fluid with conductive microscopic particles, a liquid metal, and eutectic alloys such as galinstan. All such fluid and gels are sometimes referred to herein as flowable materials or fluids, or liquids. A low resistance (less than 10 ohms) connection is made through the liquid between the elements that each engages the liquid.

Figure 7:
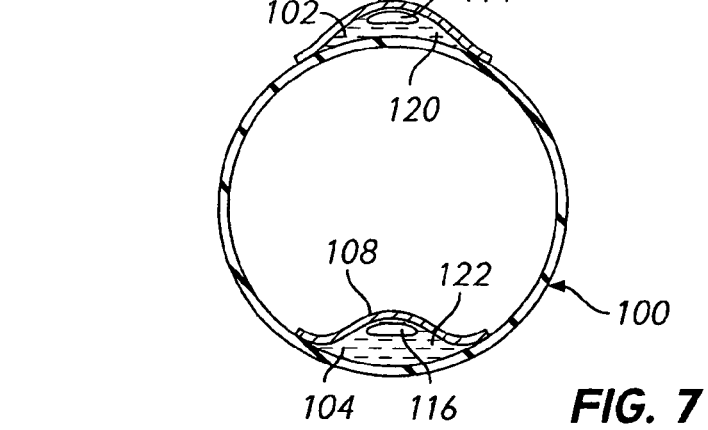
FIG. 7 is a sectional view of a tube similar to that of FIG. 1, but with two connection assemblies that connect to different electrodes of the tube.

FIG. 7 illustrates a tube 100 of elastomeric material and a pair of flexible (but not necessarily elastic) walls that form two cavities 102, 104 at spaced locations on the tube. Each cavity lies under a loop 106, 108 in a wall. The loop 106 has loop ends 105, 107. One cavity 102 is used to establish contact with the outer electrode 34 (FIG. 3) while the other cavity 104 is used to establish contact with the inner electrode 32. A pair of non-stretchable, rigid conductors 114, 116 are provided that each establishes electrical contact with one of the conductive liquids 120, 122 in one of the cavities.

Figure 8:
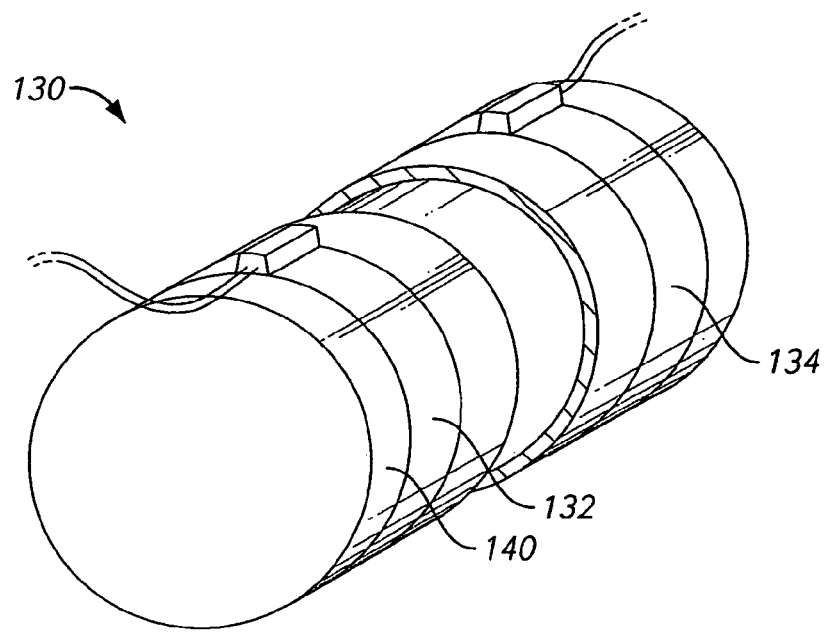
FIG. 8 is a partial isometric and sectional view of a connection assembly similar to that of FIG. 4, but with two connectors that extends around the outside of the elastic tube.
Figure 9:
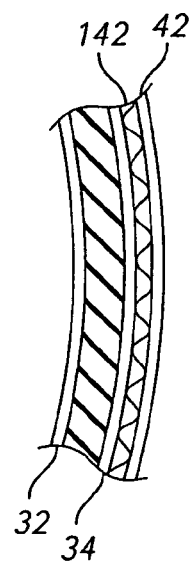
FIG. 9 is a sectional view of a portion of the assembly of FIG. 8.

FIG. 8 illustrates another system 130 wherein a pair of electrically conductive elastomeric ring 132, 134 are mounted into a tube 140 of elastomeric material. One ring 132 is connected to the outside, or outer, electrode of the tube (34, FIG. 3) and the other ring is connected to the inside electrode (32) on the tube. Both connections are made through conductive fluid in a corresponding cavity. FIG. 9 shows that the outer electrode 142 can be a corrugated thin sheet. Another alternative is that surface regions of an elastic sheet can be impregnated with conductive particles.

Figure 10:
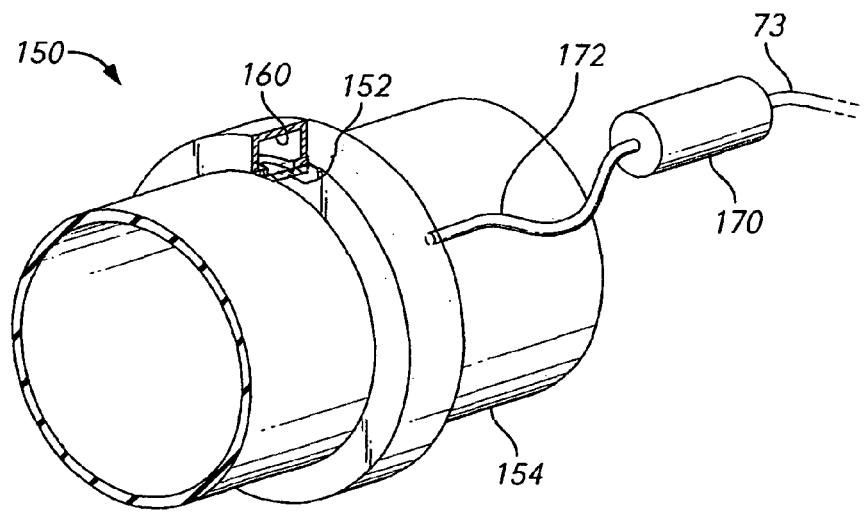
FIG. 10 is a sectional isometric view of a system interface of another embodiment of the invention.
Figure 11:
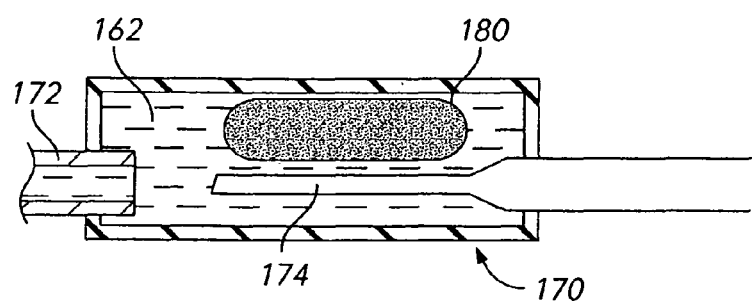
FIG. 11 is a sectional side view of the pouch of the system of FIG. 10.
Figure 12:
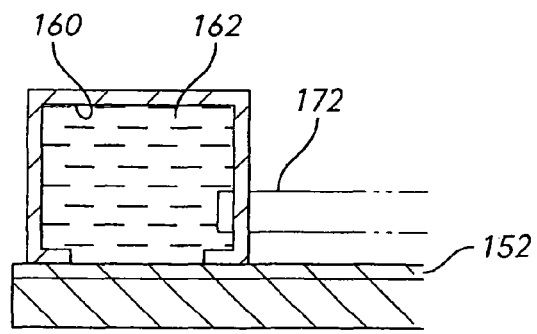
FIG. 12 is a sectional view of walls forming a cavity of FIG. 10.

FIGS. 10-12 illustrate a system 150 with an electrical interface that includes an electrode 152 on the outer surface of a tube 154. The system forms a cavity 160 filled with a conductive flowable medium 162 (FIG. 12), such as a conductive fluid, that engages the electrode 152. The system includes a pouch 170 (FIG. 11) that contains the conductive fluid 162 under pressure. The pouch is connected to the cavity 160 through a flexible tube 172 that is filled with the conductive fluid. A hard conductor connects to the pouch and/or conductive fluid in the pouch by direct contact with the fluid. FIG. 11 shows the flattened end 174 of the cable conductor lying in the pouch and in direct contact with the fluid. Means for pressurizing the fluid can include a resilient pouch, or an expandable envelope 180 in the pouch, that pressurizes the fluid to assure that the fluid completely fills the pouch and the cavity 160.

Figure 13:
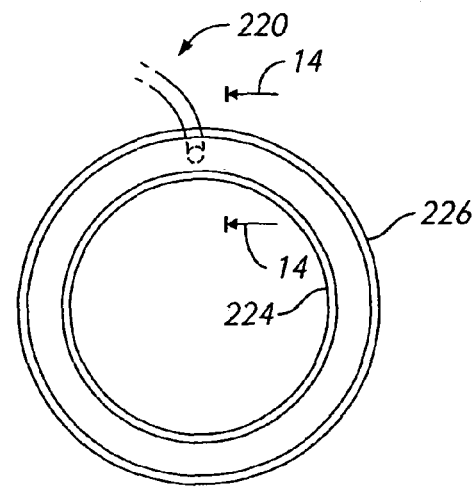
FIG. 13 is a sectional view of another connection assembly.
Figure 14:
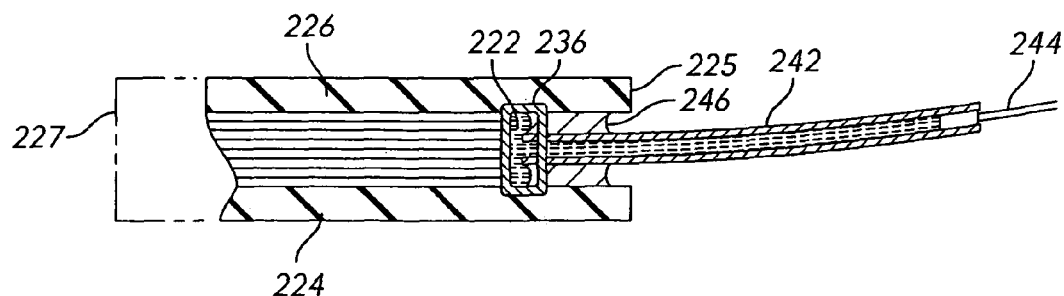
FIG. 14 is a sectional view taken on line 14-14 of FIG. 13.
Figure 15:
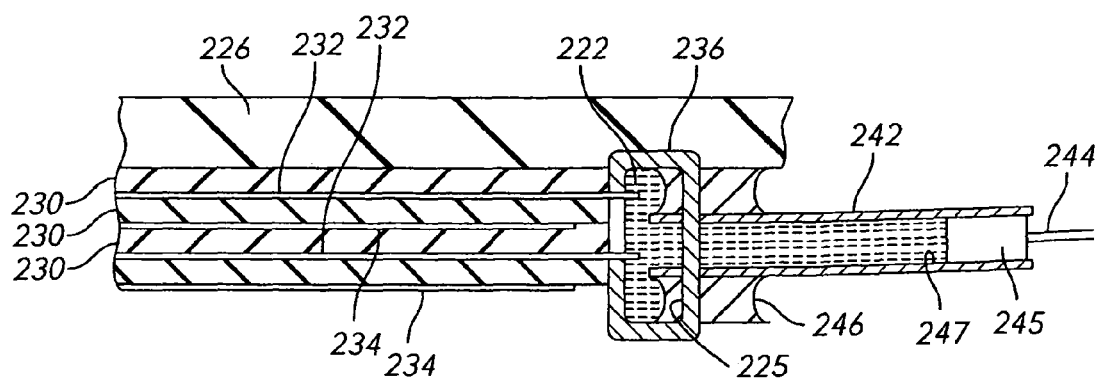
FIG. 15 is an enlarged view of a portion of a system modified from FIG. 14.

FIGS. 13-15 illustrate another connection assembly 220 in which a conductive fluid 222 is used to establish a low resistance electrical connection between elastomeric and rigid parts. A pair of sheets 224, 226 of elastomeric material are each of cylindrical shape, with an inner cylinder 224 lying concentric with an outer cylinder 226. A plurality of layers 230 (FIG. 15) of elastomeric material lie between the cylinders 224, 226 and a plurality of electrodes 232, 234 lie between the layers 230.

The connection assembly 220 has axially opposite ends 225, 227. Alternate first electrodes 232 are connected by a fitting 236 to the electrically conductive fluid 222 which lies in a cavity 225. The conductive fluid 222 lies in a tube 242 and lies in direct contact with a conductive wire 244 such as one made of stainless steel that has a mount 245 that lies in a chamber 247. An elastic seal 246 such as of non-conductive silicone, seals the fitting 236. In a preferred embodiment, the fitting 236 is formed of a conductive elastomeric material that is impermeable to the conductive fluid 222 but carries electrical current to and from the conductive fluid. Alternate second electrodes 234 have second axial ends that are connected through a fitting etc. at the second end 227 of the connection assembly.

Figure 16:
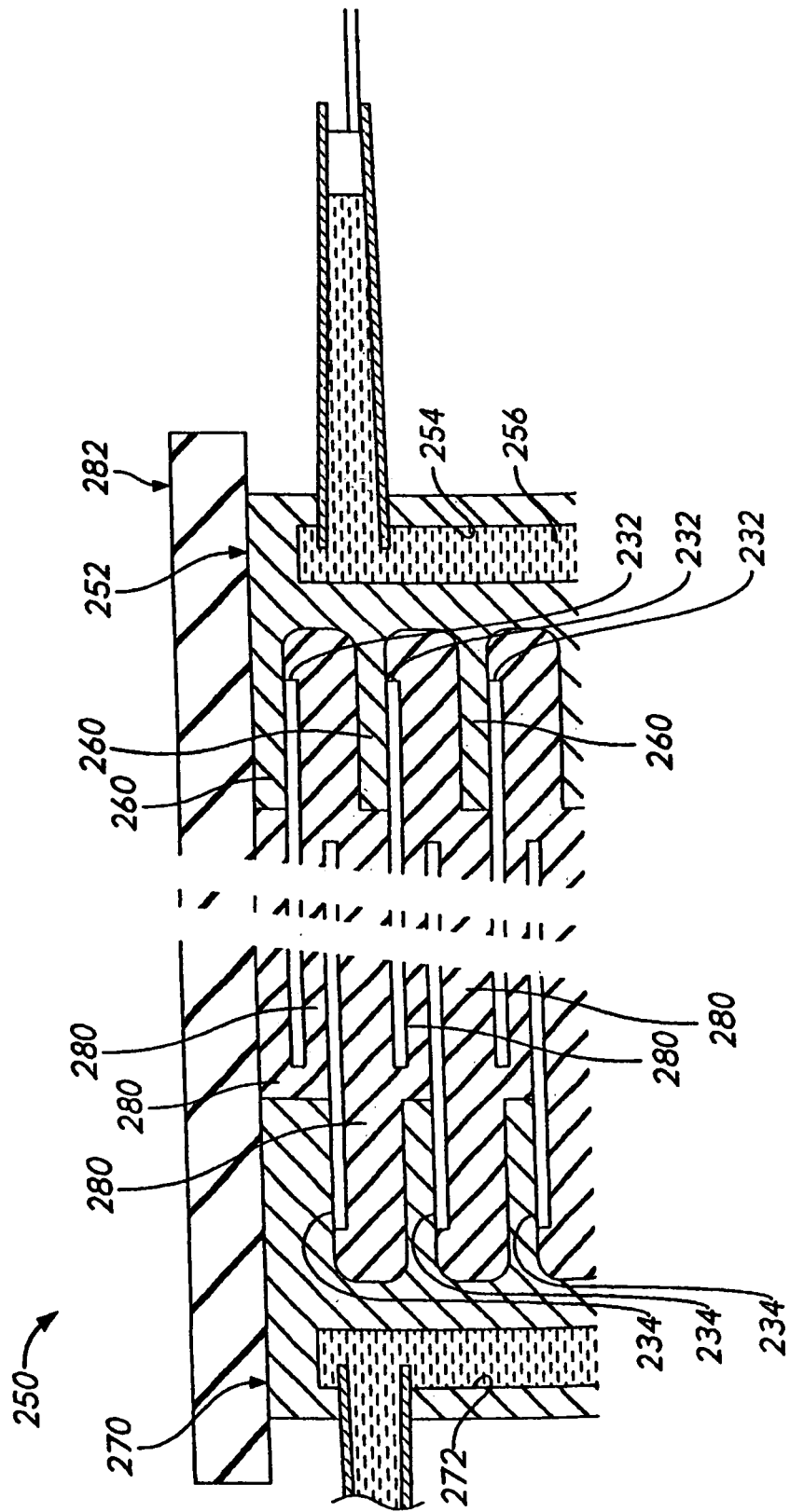
FIG. 16 is a sectional view of a system modified from the system of FIG. 15.

FIG. 16 shows a connection assembly 250 that is modified from the assembly of FIG. 15. The assembly 250 includes an elastomeric and electrically conductive first seal 252 that has a cavity 254 filled with conductive liquid 256. First electrodes 232 engage parts 260 of the conductive seal 252, as by being soldered, clamped, etc. to the parts. A second electrically conductive and elastomeric seal 270 has a cavity 272 containing conductive liquid. The second seal contacts second electrodes 234. The electrodes lie between layers 280 of elastic material that have stretched (or been compressed). The layer 280, electrodes 232, 234, and seals 252, 270 lie in a frame 282 and in a compression fit with the frame. As stretching (or compression) of the layers are increased and decreased, the electrodes 232, 234 move closer and further apart, to vary the voltage between adjacent electrodes. This allows the generation of electrical power as by the flow of current from a higher voltage electrode through a load, and into a lower voltage electrode.

Thus, the invention comprises an electrical connection assembly where a rigid conductor such as one of stainless steel or other hard material, is electrically connected to a thin expandable/contractible electrode lying on a face of a sheet of elastomeric material. The assembly includes walls forming a cavity that repeatedly changes shape so its width and/or height can expand to at least 120% of its smallest width and height and change shape. A quantity of electrically conductive liquid lies in the cavity and maintains electrical contact with both the rigid conductor and the electrode despite changes in shape.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An electrical connection assembly which includes:

walls forming a cavity (76);

a quantity (84) of electrically conductive liquid lying in said cavity and filling it;

first and second conductors (34, 80, 90) of solid electrically conductive material, said first and second conductors are out of direct contact with each other so current cannot flow directly between said first and second conductors, but said first and second conductor are each in low resistance (no more than 10 ohms) contact with said electrically conductive liquid.

2. The assembly described in claim 1 wherein:

said first conductor (34, 80, 232) lies in said cavity (76, 225);

said second conductor (90, 245) lies in a chamber 247 that is spaced from said cavity; and including a tube (242) that connects said cavity and said chamber, with said electrically conductive liquid filling said tube, said chamber, and said cavity.

3. The assembly described in claim 1 including:

means for pressurizing said electrically conductive liquid.

4. An electrical connection assembly comprising:

a plurality of layers (260, 280) of material that is both elastic and electrically insulative material (260), a plurality of electrically conductive electrodes (232, 234) lying between said layers, and a frame (282) within which said layers and electrodes are mounted;

a fitting (252) of electrically conductive material which lies in said frame, said fitting being electrically connected to each of a plurality of said electrodes, and said fitting being constructed of flexible material.

5. The assembly described in claim 4 wherein:

said fitting forms a cavity (254), and including a conductor (244) of rigid material, a tube (242) that connects said conductor to said fitting that forms a cavity, and a quantity of electrically conductive fluid (222, 256) that fills said tube and said cavity, thereby to electrically connect said conductor to said electrodes.

6. An electrical connection assembly (70) for connecting a hard conductor (82, 90) to a second electrode (34, 80) that lies at a face of a sheet (30) of elastomeric material that is capable of being stretched and relaxed, where a first electrode (32) lies at a face of said sheet that is opposite said second electrode, and the voltage between said electrodes varies as said sheet stretches and relaxes, wherein:

said electrical connections assembly (70) includes deflectable walls (72, 34, 80) forming a cavity (76), said cavity walls are connected to said second electrode (34, 80); and including a quantity of electrically conductive flowable material (84) which fills said cavity;

said hard conductor (82, 90) lies in electrical contact with said conductive flowable material;

said sheet extends in the shape of a hollow cylinder, with a loop (72) on top of said cylinder, and with said cavity (76) lying under said loop and holding said flowable material.

7. The assembly described in claim 6 wherein:

said walls forming a cavity includes a lower wall (74) comprising said second electrode (34, 80) that lies on said sheet of elastic material and an upper wall (72) that extends in a loop (106) that has opposite loop ends (105, 107) engaged with and sealed against said lower wall and with a loop middle (109) that is spaced from said lower wall by a distance that varies with stretching of said lower wall.

8. The assembly described in claim 6 including:

walls forming a second loop (108) extending radially inward into said cylinder and forming a second cavity (104).

9. The assembly described in claim 6 including:

a pouch (170) and a tube (172) that connects said pouch to said cavity, said conductive flowable material including quantities of conductive fluid lying in said pouch, in said tube (172), and in said cavity.

10. An electrical connection assembly (70) for connecting a hard conductor (82, 90) to a second electrode (34, 80) that lies at a face of a sheet (30) of elastomeric material that is capable of being stretched and relaxed, where a first electrode (32) lies at a face of said sheet that is opposite said second electrode, and the voltage between said electrodes varies as said sheet stretches and relaxes, wherein:

said electrical connection assembly (70) includes deflectable walls (72, 34, 80) forming a cavity (76), said cavity walls are connected to said second electrode (34, 80); and including a quantity of electrically conductive flowable material (84) which fills said cavity;

said hard conductor (82, 90) lies in electrical contact with said conductive flowable material, and wherein said assembly includes a frame (282);

said deflectable walls forming a cavity form a fitting (252) of electrically conductive and elastomeric material, said fitting being electrically connected to said first electrodes (232), and said frame lies around said fitting and said electrodes, with said fitting lying in a compression fit with said frame to seal said fitting to said frame.

* * * * *